(12) United States Patent
Li et al.

(10) Patent No.: US 8,929,711 B2
(45) Date of Patent: Jan. 6, 2015

(54) ANALOG SIGNAL RECORDING SYSTEM

(71) Applicant: Aviacomm Inc., Santa Clara, CA (US)

(72) Inventors: Tao Li, Campbell, CA (US); Hans Wang, Mountain View, CA (US); Shih Hsiung Mo, San Jose, CA (US); Binglei Zhang, San Jose, CA (US)

(73) Assignee: Aviacomm Inc., Santa Clara, CA (US)

( * ) Notice: Subject to any disclaimer, the term of this patent is extended or adjusted under 35 U.S.C. 154(b) by 0 days.

(21) Appl. No.: 13/645,254

(22) Filed: Oct. 4, 2012

(65) Prior Publication Data

US 2014/0099083 A1    Apr. 10, 2014

(51) Int. Cl.
*H04N 5/765* (2006.01)
*H04N 5/76* (2006.01)

(52) U.S. Cl.
USPC ............................................ 386/232; 386/341

(58) Field of Classification Search
USPC .................. 386/232, 314, 323, 324, 326, 341
See application file for complete search history.

(56) References Cited

U.S. PATENT DOCUMENTS

| | | | | |
|---|---|---|---|---|
| 2002/0090915 A1* | 7/2002 | Komara et al. | ............... | 455/69 |
| 2007/0263754 A1* | 11/2007 | Currivan et al. | ............. | 375/349 |
| 2011/0052152 A1* | 3/2011 | Ida | .............................. | 386/279 |

* cited by examiner

*Primary Examiner* — Robert Chevalier
(74) *Attorney, Agent, or Firm* — Shun Yao; Park, Vaughan, Fleming & Dowler LLP

(57) ABSTRACT

One embodiment of the present invention provides a signal-recording system. During operation, the system receives a wideband multi-channel radio frequency (RF) signal, which includes a plurality of single-channel RF signals modulated at different carrier frequencies. The system down-converts the received wideband multi-channel RF signal to baseband, and records the down-converted signal.

14 Claims, 5 Drawing Sheets

ANALOG SIGNAL RECORDING SYSTEM

BACKGROUND

1. Field

The present disclosure relates generally to a signal recording system. More specifically, the present disclosure relates to a signal recording system capable of recording multi-channel signals in an analog form.

2. Related Art

Digital video recorders (DVRs) refer to electronic devices that record video, such as TV programs, in a digital format to various storage devices, such as a disk drive, a USB flash drive, a memory card, and other local or networked mass storage devices. TV DVRs provide users with more convenient time-shifting features, and enhance their TV-viewing experiences. For example, users are able to pause live TV, instant replay an interesting scene, chase-play a TV program, and skip advertising. Since the launch of TiVo, DVRs have gained popularity among consumers. Many satellite, cable, and IPTV companies are now incorporating digital video recording functions into their set-top boxes. As of 2011, nearly 40% of households in the US own a DVR.

However, there is one drawback to conventional DVRs. Many currently available DVRs only allow users to record one TV channel at a time. Even with dual-tuner or triple-tuner DVRs, the users are only allowed to record two or three TV channels at a time. If a user wishes to scan through all TV programs shown within a particular time period (such as the day before), conventional DVRs will fail because they can only record a selected few (up to three) channels while programs shown on other channels are lost.

SUMMARY

One embodiment of the present invention provides a signal-recording system. During operation, the system receives a wideband multi-channel radio frequency (RF) signal, which includes a plurality of single-channel RF signals modulated at different carrier frequencies. The system down-converts the received wideband multi-channel RF signal to baseband, and records the down-converted signal.

In a variation on this embodiment, the system up-converts the recorded signal to an original RF band, and receives the up-converted signal, thereby enabling a replay of a single-channel RF signal selected from the plurality of single-channel RF signals.

In a variation on this embodiment, while down-converting the received wideband multi-channel signal, the system performs a quadrature down-conversion.

In a variation on this embodiment, the wideband multi-channel RF signal includes one of: a broadcast TV signal, a cable TV signal, a satellite TV signal, a broadcast radio signal, a WiFi signal, and a mobile phone signal.

In a further variation, the broadcast TV signal covers an entire ultra high frequency (UHF) TV band.

In a variation on this embodiment, recording the down-converted signal involves analog recording.

In a further variation, the analog recording is performed by a recorder based on magnetic tapes.

In a variation on this embodiment, the wideband multi-channel RF signal has a bandwidth that exceeds 400 MHz.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a TV program recording system that records the TV program in an analog format. More specifically, the system first receives an RF TV signal that includes programs in all channels, down-converts the RF signal to a baseband analog signal, and then records the baseband signal in its analog format without converting it to the digital domain. When one wants to view the TV programs, the system up-converts the recorded baseband signal back to its original RF band, and sends the RF signal to a TV player.

In the present disclosure, the term "channel" refers to a communication channel that can be used to convey an information signal from one or more transmitters to one or more receivers. It can include RF frequency bands used for broadcast TV, broadcast radio, WiFi, cellular communication, etc.

The Recording System

DVRs have provided current TV viewers with never before seen benefits, including flexibility in viewing time and enhanced experience. Many DVRs even allow a user to watch one TV program on one channel while recording another TV program shown on a different channel. However, the user TV-viewing experience can be further enhanced if he can record TV programs shown on all channels at once. Such a task can be difficult for conventional DVRs, which are only designed to record signals from one or two channels at a time. If a user wishes to record more than two channels, he may need to purchase a second DVR.

To solve this problem, embodiments provide a recording system capable of recording analog signals that carry TV programs from all channels. The recorded analog signals can be played on a regular TV set, and a user can browse all programs by changing channels on the TV set.

In the United States, broadcasting TV signals are transmitted at frequencies in the ultra high frequency (UHF) band. More specifically, the 70 UHF channels (channel 14-channel 83) occupy a frequency band ranging between 470 MHz and 890 MHz with a channel width of 6 MHz. The overall bandwidth of the UHF TV channels is 420 MHz. Therefore, to record TV signals of all 70 channels, a wideband system having at least 420 MHz bandwidth is needed.

Figure 1:
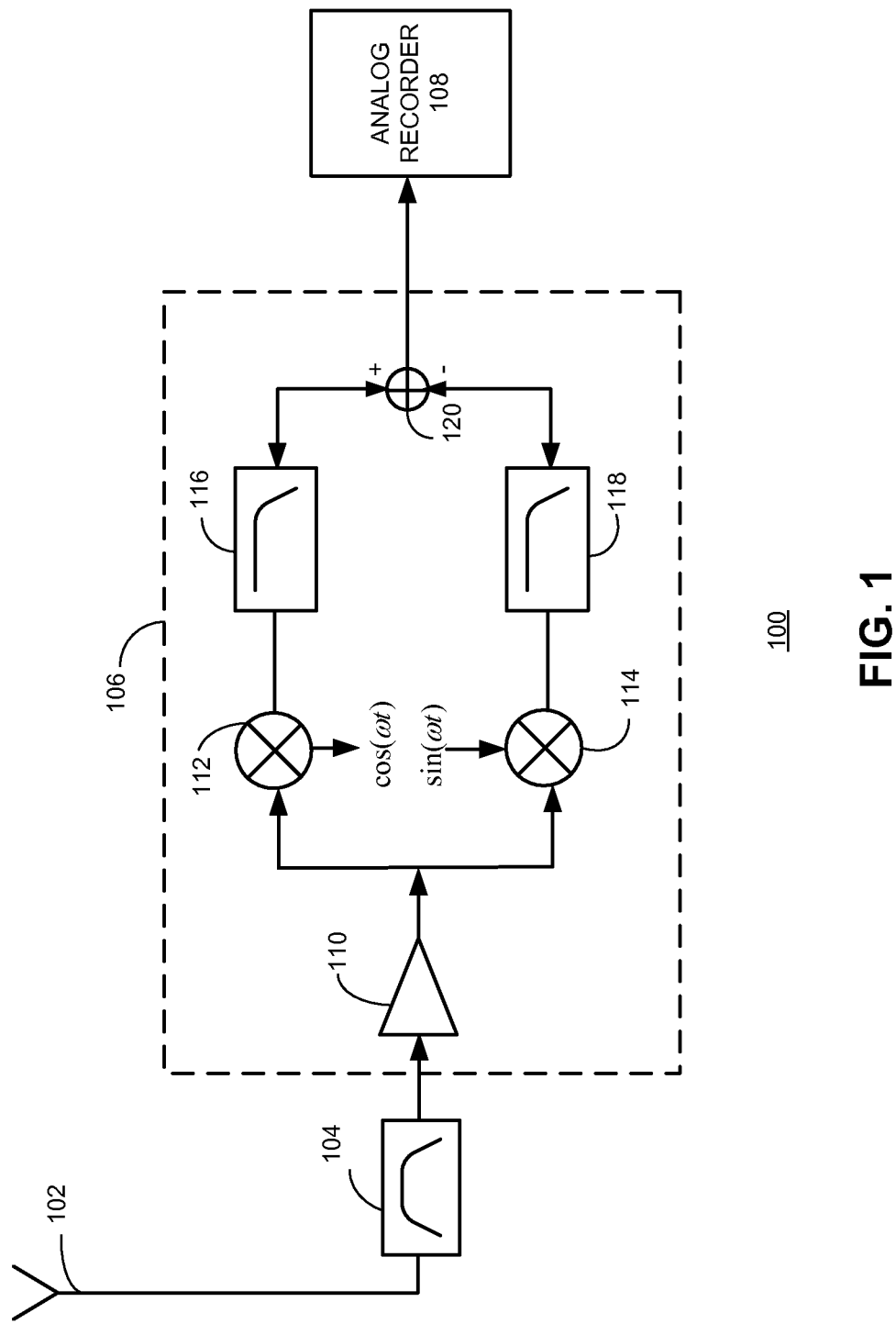
FIG. 1 presents a diagram illustrating the architecture of an exemplary analog signal recording system, in accordance with an embodiment of the present invention.

FIG. 1 presents a diagram illustrating the architecture of an exemplary analog signal recording system, in accordance with an embodiment of the present invention. In FIG. 1, analog signal recording system 100 includes an antenna 102, a band-pass filter (BPF) 104, a wideband down-converter 106, and an analog recorder 108.

During operation, antenna 102 receives broadcast RF signals, which are sent to BPF 104. BPF 104 filters out any out-of-band signals and only allows RF signals within the desired frequency band to pass through. In one embodiment, to receive TV signals in the UHF band, the center frequency of BPF 104 is set at 680 MHz and its bandwidth is at least 420 MHz.

Wideband down-converter 106 down-converts the RF signals from the RF band to the baseband. More specifically, wideband down-converter 106 includes a low-noise amplifier (LNA) 110, mixers 112 and 114, low-pass filters (LPFs) 116 and 118, and an adder 120.

LNA 110 amplifies the filtered signal to compensate for the insertion loss introduced by the filtering and the subsequent down-converting process. It is desirable to implement a wideband LNA that accommodates the width of the entire TV band. In one embodiment, LNA 110 is capable of amplifying signals with frequencies ranging from 300 MHz to 3 GHz.

Mixers 112 and 114 are parts of an IQ down-converter. Note that other standard components, such as a local oscillator and a phase shifter, of the down-converter are not shown in FIG. 1. Down-converted signals in the I and Q channels pass through LPFs 116 and 118, respectively, which filter out signals at the sum frequency. Adder 120 combines signals from the I and Q channels to obtain the baseband signal.

Figure 2A:
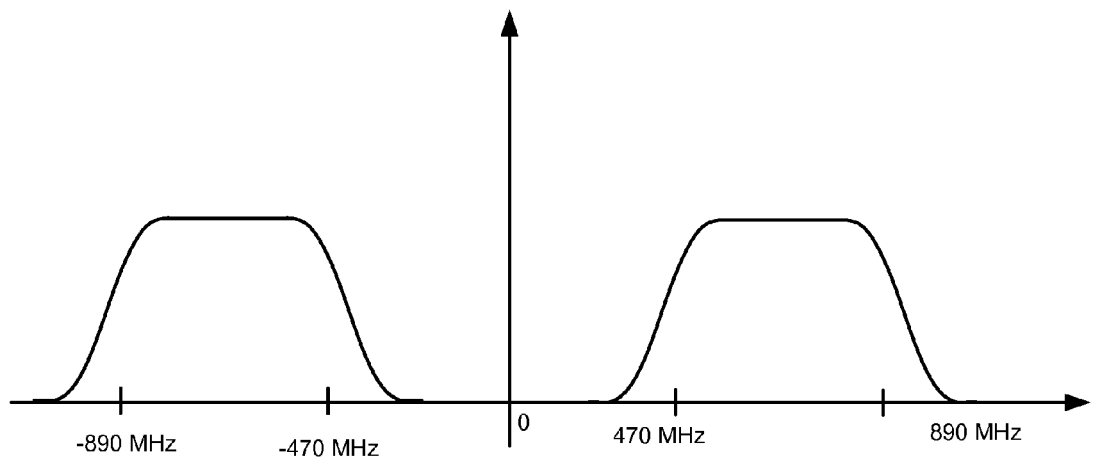
FIG. 2A presents a conceptual diagram illustrating an exemplary spectrum of TV signals in the UHF band.
Figure 2B:
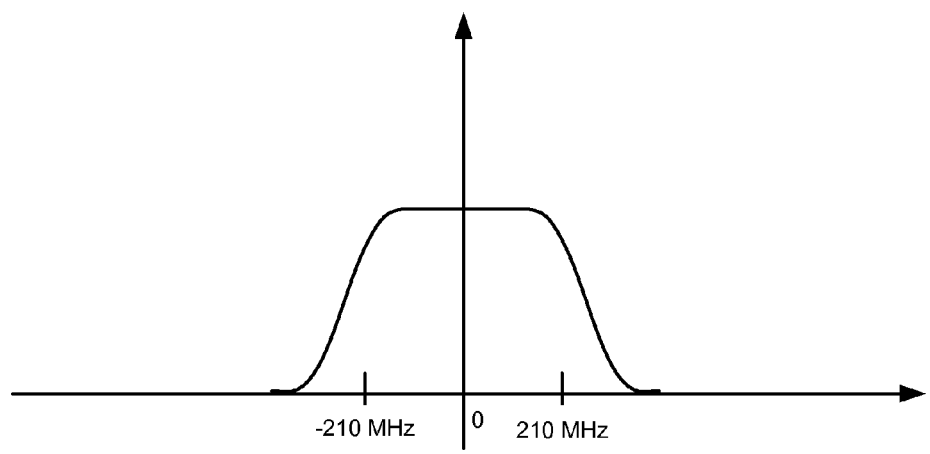
FIG. 2B presents a conceptual diagram illustrating the down-converted TV signals, in accordance with an embodiment of the present invention.

To down-convert the exemplary UHF TV signals from the RF band to baseband, in one embodiment, the carrier frequency of mixers 112 and 114 is set as 680 MHz, which is the mid frequency point of the UHF TV band. In addition, the bandwidth of LPFs 116 and 118 is set as 210 MHz. Hence, signals from all TV channels in the UHF band are now down-converted to a baseband signal having a bandwidth of 210 MHz. FIG. 2A presents a conceptual diagram illustrating an exemplary spectrum of TV signals in the UHF band. FIG. 2B presents a conceptual diagram illustrating the down-converted TV signals, in accordance with an embodiment of the present invention. Note that down-conversion schemes other than IQ down-conversion are also possible to down-convert the UHF TV signals into the baseband signal. For example, a single mixer is also able to down-convert the RF signals to baseband signals. However, these other down-conversion schemes often have to deal with the problem of image frequencies.

Although the bandwidth of this baseband signal is still relatively wide when compared with the TV signal of a single channel, it is still possible to directly save this down-converted baseband signal without further processing, such as filtering, demodulating, DA converting, decoding, etc. In order to prevent any information loss, it is desirable to save this down-converted baseband signal in its analog form. In one embodiment, an analog recording medium is used to store the TV baseband signal. In a further embodiment, a magnetic tape, similar to the one used for VCR, is used to store the TV baseband signal. Other types of storage medium are also possible as long as they can provide sufficient bandwidth and dynamic range.

Figure 3:
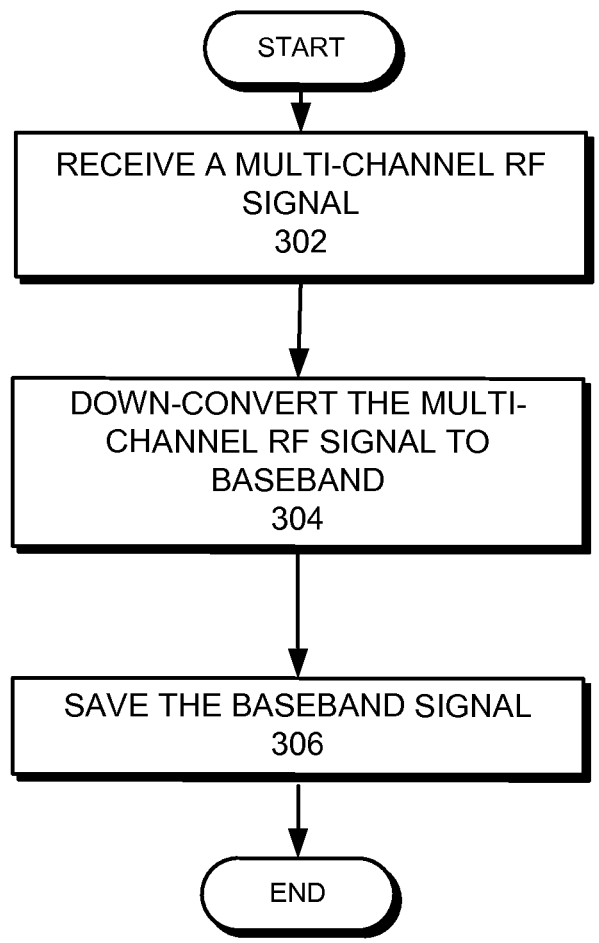
FIG. 3 presents a flowchart illustrating the process of recording the multi-channel TV signals, in accordance with an embodiment of the present invention.

FIG. 3 presents a flowchart illustrating the process of recording the multi-channel TV signals, in accordance with an embodiment of the present invention. During operation, the system receives a wideband multi-channel RF signal, which includes RF signals modulated at multiple carrier frequencies (operation 302). In one embodiment, the multi-channel RF signal is a broadcast TV signal that includes signals from all channels in the UHF band. In a further embodiment, the bandwidth of the wideband multi-channel RF signal is greater than 400 MHz. The system then down-converts the wideband multi-channel RF signal to baseband (operation 304). In one embodiment, a quadrature down-converter is used to perform the down-conversion. Note that, in addition to down-conversion, the system may also amplify the signal to compensate for insertion loss induced by the down-conversion and other operations. Subsequently, the system saves the baseband signal (operation 306). It is preferable to save the baseband signal in its analog form on an analog medium to prevent signal distortion. In one embodiment, the baseband signal is saved onto a magnetic tape. However, it is also possible to save the baseband signal digitally using an analog-to-digital converter (ADC) having a sufficiently high bandwidth.

Figure 4:
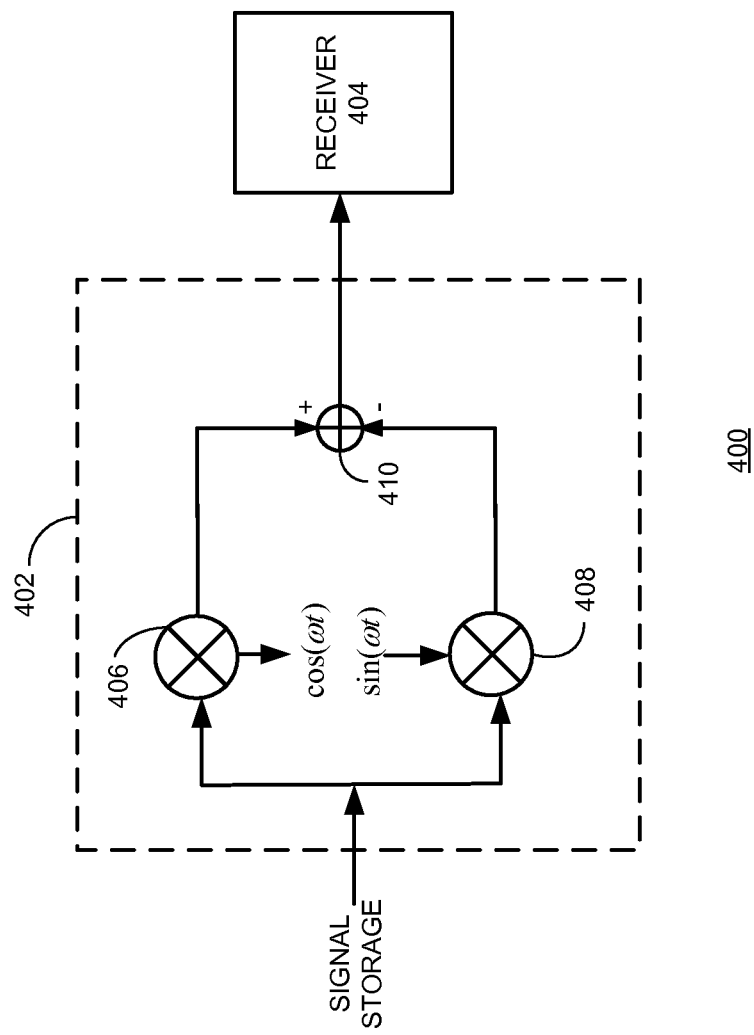
FIG. 4 presents a diagram illustrating the architecture of an exemplary signal-replay system, in accordance with an embodiment of the present invention.

Note that because the down-converted TV baseband signal carries information for all channels, after recording, a user can access the stored TV baseband signal to browse and select programs from any channel. FIG. 4 presents a diagram illustrating the architecture of an exemplary signal-replay system, in accordance with an embodiment of the present invention.

In FIG. 4, signal-replay system 400 includes an up-converter 402 and a receiver 404. Up-converter 402 reads the stored baseband signal from the signal storage and up-converts the baseband signal to its original RF domain. If the signals were TV signals in the UHF band, up-converter 402 up-converts the baseband signal back to the UHF band using a carrier frequency set at 680 MHz. Up-converter 402 includes mixers 406 and 408, and an adder 410. Note that other standard components of up-converter 402, such as a local oscillator and a phase shifter, are not included in FIG. 4. Also note that if the signal storage is a digital medium, digital-to-analog (DA) conversion is needed prior to up-converting the signal to the RF band.

After up-conversion, the signal returns to its original format as if it were received directly by antenna 102 and filtered by BPF 104. Therefore, an appropriate receiver 404 is able to receive the signal. Any further processing, such as filtering, demodulating, DA converting, and decoding, are performed at this point by receiver 404. In one embodiment, if the signal is a TV signal, then receiver 404 can be a standard TV set, which can receive and demodulate signals for each particular channel. Hence, by operating the TV set, the user can browse programs from all the channels as if the programs were currently being broadcast.

Up-converting the baseband signal makes the use of a standard receiver, such as a conventional TV set, possible. Hence, the user is not burdened with the purchase of new hardware in order to replay the recorded multi-channel signal. However, it is also possible to directly obtain information, such as TV programs, carried by the baseband signal, as long as a baseband signal player is implemented. In the example of broadcast TV, a separate TV set with its tuner set at new frequencies (the original channel frequencies minus 680 MHz) will allow the user view the TV programs from all channels. Other functions of the TV, such as decoding, remain unchanged.

Figure 5:
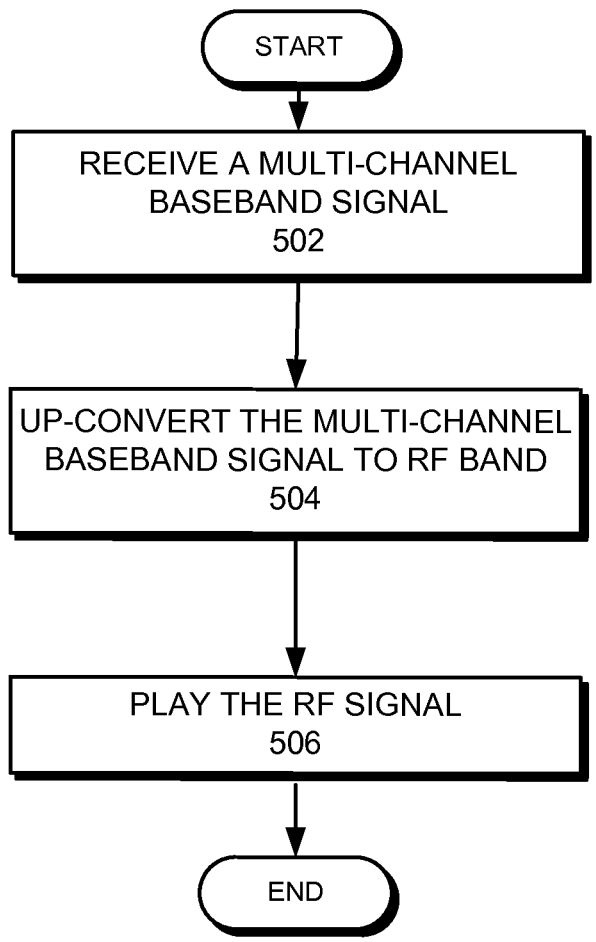
FIG. 5 presents a flowchart illustrating the process of replaying the multi-channel signal, in accordance with an embodiment of the present invention.

FIG. 5 presents a flowchart illustrating the process of replaying the multi-channel signal, in accordance with an embodiment of the present invention. During operation, the system receives a multi-channel baseband signal from a storage medium (operation 502). In one embodiment, the storage medium is an analog medium. Subsequently, the system up-converts the multi-channel baseband signal to its original RF band (operation 504). In one embodiment, the baseband signal is TV signal, and the system up-converts the baseband signal to the corresponding UHF band. After up-conversion, the system plays the RF signal using an appropriate device (operation 506). In one embodiment, a standard TV set is used to replay the TV signals.

In general, compared with traditional TV DVR schemes, such as TiVo, which usually demodulate and/or decode an RF signal for a particular channel before storing it, in embodiments of the present invention, the multi-channel TV signals are converted to baseband, and then stored directly without further processing, such as individual demodulation of each channel. Therefore, the stored baseband signal carries information from all channels.

Note that the architectures shown in FIGS. 1 and 4, and the processes shown in FIGS. 3 and 5 are merely exemplary and should not limit the scope of this disclosure. For example, in FIGS. 1 and 4, a quadrature down-converter and up-converter are used, respectively. In general, other frequency conversion schemes are also possible.

Also note that this disclosure uses broadcast TV as an example for storing multi-channel signals. Other types of multi-channel signal, including but not limited to: cable or satellite TV signals; or other radio signals, such as broadcast radio, WiFi, and mobile phone signals can also be recorded using the system described in this disclosure. For example, for the purpose of radio surveillance, the multi-channel recording system can be configured to record mobile phone signals designated to a plurality of user devices (such as all mobile devices within a cell) without any further processing (other than down-conversion to baseband) of the signals. Using appropriate receiving devices, the recorded mobile phone signals can be replayed and analyzed to enable various surveillance functions.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for simultaneously recording television signals from multiple television channels, comprising:
   receiving a wideband multi-channel radio frequency (RF) signal, which includes the television signals from the multiple television channels; and
   simultaneously recording the television signals from the multiple television channels, wherein the simultaneous recording involves:
      using a single quadrature demodulator to down-convert the received wideband multi-channel RF signal, which includes the television signals from the multiple television channels, to baseband; and
      directly recording the down-converted baseband signal without any further processing of the down-converted baseband signal.

2. The method of claim 1, further comprising:
   up-converting, using a single quadrature modulator, the recorded baseband signal to an original RF band to obtain the original television signals from the multiple television channels; and
   receiving the up-converted signal, thereby enabling a replay of a single-channel TV signal.

3. The method of claim 1, wherein the wideband multi-channel RF signal includes one of:
   a broadcast TV signal;
   a cable TV signal;
   a satellite TV signal;
   a broadcast radio signal;
   a WiFi signal; and
   a mobile phone signal.

4. The method of claim 3, wherein the broadcast TV signal covers an entire ultra high frequency (UHF) TV band.

5. The method of claim 1, wherein recording the down-converted baseband signal involves recording the down-converted baseband signal in an analog form as an analog baseband signal.

6. The method of claim 5, wherein recording the down-converted signal in the analog form is performed by a recorder based on magnetic tapes.

7. The method of claim 1, wherein the wideband multi-channel RF signal has a bandwidth that exceeds 400 MHz.

8. A system for simultaneously recording television signals from multiple television channels, comprising:
   a receiving mechanism configured to receive a wideband multi-channel radio frequency (RF) signal, which includes the television signals from the multiple television channels; and
   a television-signal recorder configured to simultaneously record the television signals from the multiple television channels,
   wherein while simultaneous recording the television signals the television-signal recorder is configured to:
      use a single quadrature demodulator to down-convert the received wideband multi-channel RF signal, which includes the television signals from the multiple television channels, to baseband; and
      directly record the down-converted baseband signal without any further processing of the down-converted baseband signal.

9. The system of claim 8, further comprising a TV-signal re-player configured to replay the recorded television signals, wherein while replaying the recorded television signals, the TV signal re-player is configured to:
   use a single quadrature modulator to up-convert the recorded signal to an original RF band to obtain the original television signals from the multiple television channels; and
   replay a single-channel TV signal.

10. The system of claim 8, wherein the wideband multi-channel RF signal includes one of:
   a broadcast TV signal;
   a cable TV signal;

a satellite TV signal;
a broadcast radio signal; and
a mobile phone signal.

11. The system of claim 10, wherein the broadcast TV signal covers an entire ultra high frequency (UHF) TV band.

12. The system of claim 8, wherein the television-signal recorder further comprises an analog signal-recorder configured to record the down-converted baseband signal as an analog baseband signal.

13. The system of claim 12, wherein the analog signal-recorder includes a magnetic tape recorder.

14. The system of claim 8, wherein the wideband multi-channel RF signal has a bandwidth that exceeds 400 MHz.

* * * * *